US010244540B2

(12) United States Patent
Sundararajan et al.

(10) Patent No.: US 10,244,540 B2
(45) Date of Patent: Mar. 26, 2019

(54) SYSTEMS AND METHODS FOR MIXED INTERFERENCE MANAGEMENT

(71) Applicant: QUALCOMM Incorporated, San Diego, CA (US)

(72) Inventors: Jay Kumar Sundararajan, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 15/074,342

(22) Filed: Mar. 18, 2016

(65) Prior Publication Data

US 2017/0164375 A1 Jun. 8, 2017

Related U.S. Application Data

(60) Provisional application No. 62/262,080, filed on Dec. 2, 2015.

(51) Int. Cl.
*H04W 72/08* (2009.01)
*H04W 72/12* (2009.01)

(52) U.S. Cl.
CPC ..... *H04W 72/082* (2013.01); *H04W 72/1231* (2013.01)

(58) Field of Classification Search
CPC ........... H04W 72/082; H04W 72/1231; H04W 72/0406; H04W 72/0413; H04W 72/042; H04W 36/20
See application file for complete search history.

(56) References Cited

U.S. PATENT DOCUMENTS 8,559,908 B2 10/2013 Sun et al.
8,693,316 B2 4/2014 Palanki et al.
(Continued)

FOREIGN PATENT DOCUMENTS

EP 2869619 A1 5/2015
WO WO-2013110218 A1 8/2013

OTHER PUBLICATIONS

International Search Report and Written Opinion—PCT/US2016/055337—ISA/EPO—dated Jan. 18, 2017.
(Continued)

*Primary Examiner* — Paul H Masur
(74) *Attorney, Agent, or Firm* — Qualcomm IP Dept.; James Hunt Yancey, Jr.

(57) ABSTRACT

Systems and methods for providing mixed interference management are disclosed. Implementations providing mixed interference management may provide operation to receive reported mixed interference information from at least one of one or more user equipments (UEs) served by the base station or from one or more other base stations operable in a same communication system, wherein the mixed interference information comprises information regarding at least one of downlink-to-uplink or uplink-to-downlink interference experienced by a respective reporting one of the one or more UEs and one or more other base stations, and to provide mixed interference management using the reported mixed interference information. The mixed interference information may be used to generate jamming graphs, wherein the jamming graphs provide a mixed interference profile for base stations, and wherein the jamming graphs may be used to determine whether to implement a switch of uplink/downlink subframes based on the interference mitigated mixed interference profile.

30 Claims, 5 Drawing Sheets

(56) References Cited

U.S. PATENT DOCUMENTS

2013/0260763 A1* 10/2013 Bhattad .......... H04W 36/0088 455/436
2013/0301570 A1* 11/2013 Xu .......... H04L 5/0073 370/329
2013/0336281 A1* 12/2013 Ahn .......... H04W 72/082 370/330
2013/0336302 A1* 12/2013 Lee .......... H04L 5/001 370/336
2014/0092785 A1* 4/2014 Song .......... H04L 1/00 370/280
2014/0334400 A1 11/2014 Chen et al.
2015/0055523 A1 2/2015 Lei et al.
2015/0078274 A1 3/2015 Wang et al.
2015/0103706 A1* 4/2015 Li .......... H04W 16/10 370/280
2015/0373550 A1* 12/2015 Hong .......... H04W 72/0446 370/254
2016/0205579 A1* 7/2016 Cheng .......... H04L 5/0057 370/252

OTHER PUBLICATIONS

Pateromichelakis E., et al., "On the Evolution of Multi-Cell Scheduling in 3GPP LTE / LTE-A," IEEE Communications Surveys & Tutorials, Second Quarter 2013, vol. 15 (2), pp. 701-717.

* cited by examiner

SYSTEMS AND METHODS FOR MIXED INTERFERENCE MANAGEMENT

CROSS-REFERENCE TO RELATED APPLICATIONS

This application claims the benefit of U.S. Provisional Patent Application No. 62/262,080 entitled, "SYSTEMS AND METHODS FOR MIXED INTERFERENCE MANAGEMENT", filed on Dec. 2, 2015, which is expressly incorporated by reference herein in its entirety as is fully set forth below in its entirety and for all applicable purposes.

TECHNICAL FIELD

Aspects of the present disclosure relate generally to wireless communication systems, and more particularly, to mixed interference management. Embodiments of the present invention enable and provide generation and/or regeneration of jamming graphs for mixed interference management.

INTRODUCTION

A wireless communication network may include a number of base stations or node Bs that can support communication for a number of user equipments (UEs). A UE may communicate with a base station via downlink and uplink. The downlink (or forward link) refers to the communication link from the base station or other first device (e.g., data source device) to the UE or other second device (e.g., data sink device), and the uplink (or reverse link) refers to the communication link from the UE or other second device to the base station or other first device.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, and with more UEs accessing the long-range wireless communication networks and more short-range wireless systems being deployed in communities, the possibilities of interference and congested networks grows. For example, traditional time division duplexing (TDD) implementations have utilized fixed configurations of downlink and uplink subframes, wherein the downlink and uplink scheduling is synchronized over the entire deployment. That is, the entire system follows a particular timing pattern for base station downlink and uplink communications in such a fixed configuration. Such synchronized downlink and uplink scheduling deployments have been generally acceptable due to their relatively simple deployment and management. In particular, the use of downlink and uplink synchronized scheduling limits the interference scenarios to downlink-to-downlink and uplink-to-uplink interference scenarios. Accordingly, downlink-to-uplink or uplink-to-downlink interference scenarios (collectively and separately referred to herein as mixed interference scenarios) are avoided and interference mitigation for such mixed interference scenarios need not be provided for.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method is provided according to example implementations herein. The method of some implementations includes receiving, by a base station, mixed interference information, from at least one of one or more user equipments (UEs) in communication with the base station or from one or more other base stations, that comprises information regarding at least one of downlink-to-uplink or uplink-to-downlink interference experienced by a respective reporting one of the one or more UEs and one or more other base stations. This method further includes managing, by the base station, communications with the at least one of one or more UEs in communication with the base station using the reported mixed interference information.

An apparatus is provided according to example implementations herein. The apparatus of some implementations includes means for receiving, by a base station, mixed interference information, from at least one of one or more user equipments (UEs) in communication with the base station or from one or more other base stations that comprises information regarding at least one of downlink-to-uplink or uplink-to-downlink interference experienced by a respective reporting one of the one or more UEs and one or more other base stations. This apparatus further includes means for managing, by the base station, communications with the at least one of one or more UEs in communication with the base station using the reported mixed interference information.

A non-transitory computer-readable medium having program code recorded thereon is provided according to example implementations herein. The program code of some implementations of the non-transitory computer-readable medium includes program code for causing a computer to receive, by a base station, mixed interference information, from at least one of one or more user equipments (UEs) in communication with the base station or from one or more other base stations, that comprises information regarding at least one of downlink-to-uplink or uplink-to-downlink interference experienced by a respective reporting one of the one or more UEs and one or more other base stations. This program code further causes the computer to manage, by the base station, communications with the at least one of one or more UEs in communication with the base station using the reported mixed interference information.

An apparatus having at least one processor and a memory coupled to the at least one processor is provided according to example implementations herein. The at least one processor of the apparatus of some implementations is configured to receive, by a base station, mixed interference information, from at least one of one or more user equipments (UEs) in communication with the base station or from one or more other base stations, that comprises information regarding at least one of downlink-to-uplink or uplink-todownlink interference experienced by a respective reporting one of the one or more UEs and one or more other base stations. This at least one processor of the apparatus is further configured to manage, by the base station, communications with the at least one of the one or more UEs in communication with the base station using the reported mixed interference information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
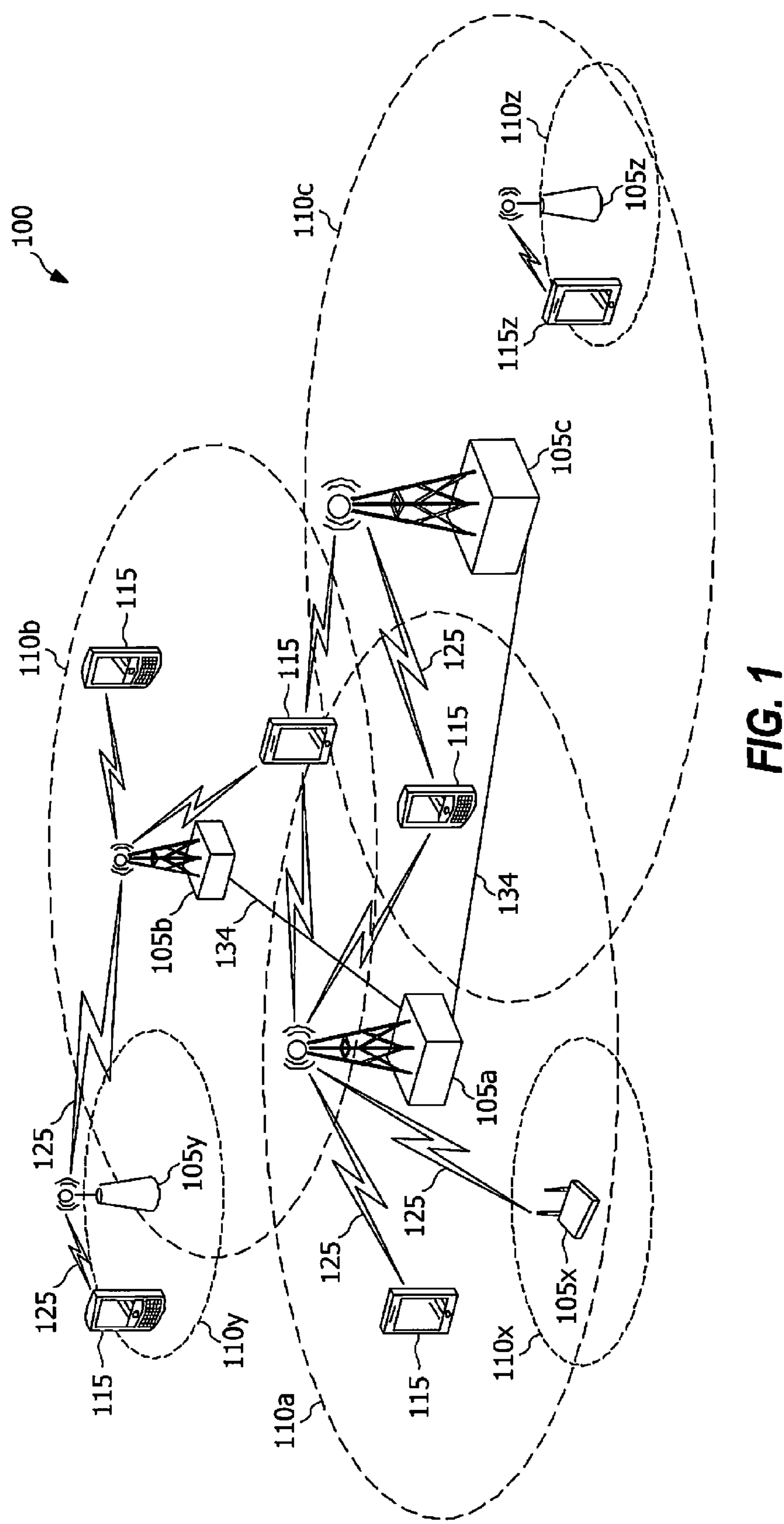
FIG. 1 is a block diagram illustrating details of a wireless communication system in which embodiments of the present invention may be deployed.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In operation of a fixed TDD configuration, the actual downlink and uplink traffic load ratio may not be aligned with the ratio of downlink and uplink subframes in the fixed configuration. For example, there may be a system wide misalignment of the downlink and uplink traffic load and fixed downlink and uplink scheduling configuration, or the misalignment may be localized (e.g., some cells may experience a different downlink and uplink load ratio than other cells within the system). If the downlink load is very high the downlink throughput may be perceived as low, even if the uplink resources are under-utilized.

Converting uplink TDD slots to downlink TDD slots (or vice versa) in some cells, such as to more closely align the downlink and uplink scheduling with the corresponding local traffic load for a particular cell, has traditionally not been practicable due to the converting of such TDD slots in some cells introducing mixed interference scenarios resulting in jamming and otherwise unacceptable interference. For example, in an uplink-to-downlink interference scenario two cell-edge UEs with different serving cells may be arbitrarily close to each other, whereby base station jamming (i.e., jamming of the base station transmission by the nearby UE's transmission) results from the downlink/uplink mismatch at the two UEs. Likewise, in a downlink-to-uplink interference scenario the receive power from an adjacent base station transmission may be much stronger than the desired uplink signals from UEs, resulting in receive de-sense at the base station receiver. Such mixed interference is particularly serious where the interference is between co-channel or adjacent-channel deployments of different operators, where there is limited or no ability for dynamic coordination.

Enhanced Interference Mitigation and Traffic Adaptation (eIMTA) was proposed for LTE to provide dynamic TDD scheduling for interference management and traffic adaptation. In operation according to eIMTA techniques, cells are not required to all be aligned in the downlink or uplink transmission direction, and may select downlink and uplink scheduling patterns for their use independently. The framework to support such independent operation of each cell in terms of transmission direction was described in eIMTA and general approaches to interference management and mitigation were also discussed. Many of the approaches would require the scheduling entity to become aware of the eNB-to-eNB and UE-to-UE interference. They would then require the scheduling entity to analyze and react to this information. Procedures for measuring and reporting mixed interference and analyzing the impact of downlink and uplink scheduling changes based on such reports were not provided. Although eNB to eNB signaling for overload indication and to exchange the uplink-downlink configuration intended to be used was accommodated in eIMTA, analysis of the impact of downlink and uplink scheduling changes prior to their being implemented was not provided for. Moreover, although some proposed implementations provided downlink and uplink scheduling changes with respect to predetermined cell clusters instead of individual cells, multi-cell mixed interference analysis for determining whether to implement the downlink and uplink scheduling changes in the eIMTA techniques were not provided. In operation, eIMTA techniques implemented further downlink and uplink scheduling changes to provide interference mitigation. Accordingly, mixed interference remains problematic in systems utilizing eIMTA techniques.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. Wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105*a*, 105*b* and 105*c* are macro eNBs for macro cells 110*a*, 110*b* and 110*c*, respectively. eNBs 105*x*, 105*y*, and 105*z* are small cell eNBs, which may include pico or femto eNBs that provide service to small cells 110*x*, 110*y*, and 110*z*, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates desired transmissions between a UE and a serving eNB, which is an eNB designated to serve the UE on the downlink and/or uplink, or desired transmission between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
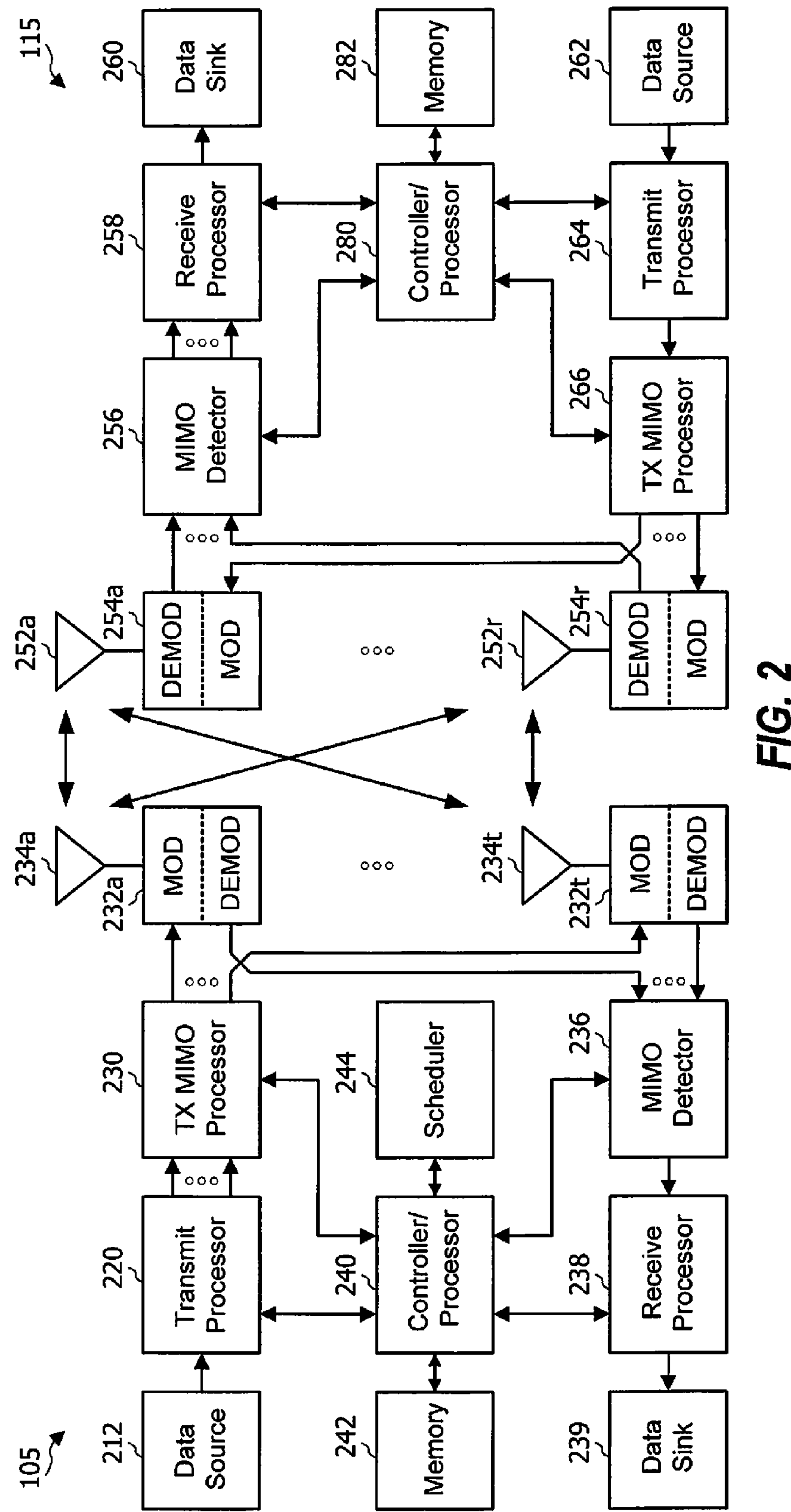
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, eNB 105 may be small cell eNB 105*z* in FIG. 1, and UE 115 may be UE 115*z*, which in order to access small cell eNB 105*z*, would be included in a list of accessible UEs for small cell eNB 105*z*. eNB 105 may also be a base station of some other type. eNB 105 may be equipped with antennas 234*a* through 234*t*, and UE 115 may be equipped with antennas 252*a* through 252*r*.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from eNB 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 and/or controller/processor 280 and/or other processors and modules at UE 115 may perform or direct the execution of various processes for the techniques described herein, such as to perform or direct the execution of the functional blocks illustrated in FIGS. 3 and 5, and/or other processes for the techniques described herein. Memories 242 and 282 may store data and program codes for eNB 105 and UE 115, respectively. Scheduler 244 may schedule UEs for data transmission on the downlink and/or uplink.

Operation according to mixed interference management techniques herein provides for managing communications, such as to dynamically switch downlink and/or uplink TDD subframes or slots, based on mixed interference information. For example, in accordance with aspects of the disclosure, logic of an eNB analyzes information regarding mixed interference to determine if a switch in downlink and/or uplink scheduling is to be implemented, such as to accommodate additional traffic in the downlink or uplink, to increase downlink or uplink throughput, to meet quality of service (QoS) metrics, to efficiently utilize the spectrum, priority, data class, device class, service class, etc. The information regarding mixed interference may include mixed interference information reported by one or more UEs served by the eNB and/or mixed interference information reported by one or more other eNBs (e.g., other eNBs in the system, neighboring eNBs, eNBs capable of providing/experiencing undesired levels of interference with respect to the eNB, etc.). The mixed interference information reported by the one or more other eNBs may include mixed interference information regarding one or more UEs served by respective ones of the other eNBs (e.g., mixed interference information reported by a UE to one of the other eNBs serving that UE). Accordingly, an eNB operating in accordance with the concepts herein may analyze the impact of downlink and uplink scheduling changes prior to their being implemented and, based on such analysis, implement dynamic switching of downlink and/or uplink slots without introducing unacceptable mixed interference.

Figure 3:
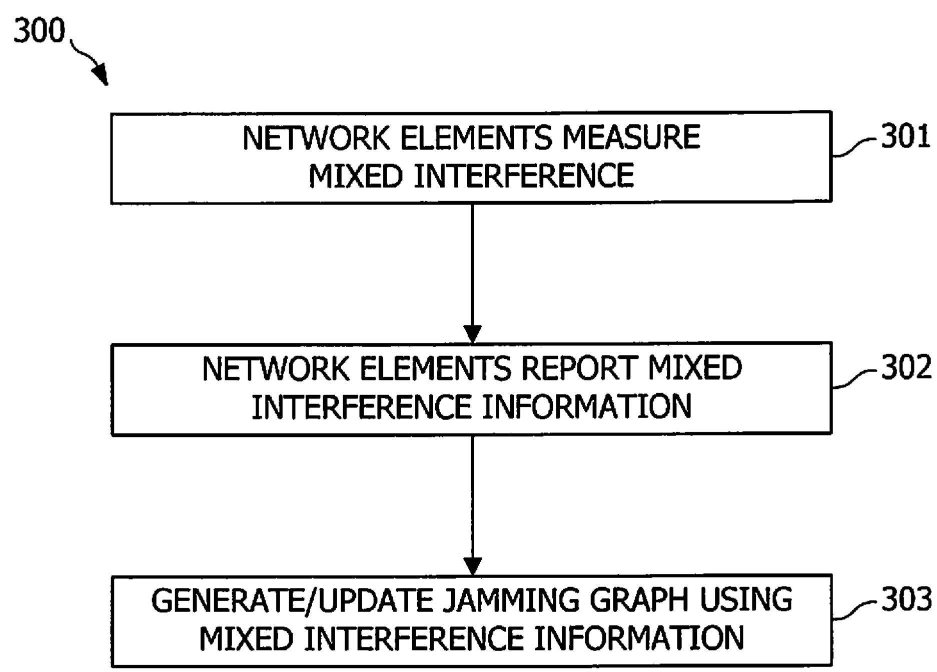
FIG. 3 shows a high level flow diagram of operation providing generation and/or regeneration of jamming graphs for mixed interference management according to one aspect of the present disclosure.

FIG. 3 shows a high level flow diagram of operation providing generation and/or regeneration of jamming graphs for mixed interference management in accordance with the concepts herein. In particular, flow 300 illustrates functions as may be performed by controller/processor 240 and/or scheduler 244 at eNB 105 and/or controller/processor 280 at UE 115 in providing mixed interference information and jamming graphs therefrom.

At block 301 of flow 300 as illustrated, network elements (e.g., one or more of eNBs 105 and/or UEs 115 of FIG. 1) make mixed interference measurements. For example, a base station (e.g., eNB 105) operating in accordance with an aspect of the disclosure may utilize information on the mixed interference profile among various network elements to determine whether switching an uplink subframe to downlink or vice versa is beneficial. In accordance with aspects herein, an eNB may utilize the base station-to-base station interference power (e.g., downlink-to-uplink interference where the receive power from an adjacent base station transmission may be much stronger than the desired uplink signals from UEs, resulting in receive de-sense at the base station receiver) as well as UE-to-UE interference power (e.g., uplink-to-downlink interference where two cell-edge UEs with different serving cells may be arbitrarily close to each other, whereby base station jamming results from the downlink/uplink mismatch at the two UEs) in determining whether switching downlink and/or uplink scheduling is beneficial. Accordingly, base stations and UEs operating within the communication system may perform mixed interference measurements to collect data relevant to the foregoing. For example, logic of eNBs 105 (e.g., logic executed by controller/processor 240) and/or logic of UEs 115 (e.g., logic executed by controller/processor 280) may implement functionality to perform mixed interference measurements as described herein.

In operation according to aspects of the disclosure, base station-to-base station mixed interference may be measured by each base station from other base stations. Similarly, UE-to-UE mixed interference may be measured by each UE from other UEs. Such mixed interference measurements may be made in accordance with the concepts herein using a variety of techniques. For example, a mixed interference measurement protocol may be implemented within the communication frame structure whereby particular subframes (referred to herein as a mixed interference measurement subframe) are utilized for transmission of reference signals for use in mixed interference measurements.

It should be appreciated that, although mixed interference is described above with reference to network environments comprising base stations in communication with UEs, the concepts herein are applicable to various network types and communication configurations. Embodiments may be implemented with respect to any transmitter/receiver configuration implementing TDD communications in which mixed interference is possible. For example, mixed interference measurements and jamming graphs for mixed interference management in accordance with the concepts herein may be provided with respect to peer-to-peer communications, device-to-device communications, mesh network communications, etc. As one example, mixed interference management of embodiments may be provided with respect to Machine Type Communications (MTC) implemented in a $5^{th}$ generation (5G) mobile network configuration. Consistent with the foregoing, the devices communicating for which mixed interference management is provided may comprise device configurations in addition to or in the alternative to those traditionally thought of as the aforementioned base stations and UEs, such as Internet appliances, measurement probes, vehicles, smart devices (e.g., Internet of Things (IoT) devices), drones, etc.

In accordance with some implementations of the foregoing, some subset of the base stations (e.g., a random or pseudo-random subset of base stations, a subset of base stations selected as being approximately evenly distributed throughout the communication system with the other base stations which are not part of the subset, a subset of base stations interleaved with the other base stations which are not part of the subset, etc.) may transmit a pilot signal during a first base station mixed interference measurement subframe, wherein another subset of the base stations (e.g., the other base stations which are not part of the pilot transmitting subset, or some portion thereof) may measure or otherwise monitor the signals received from the pilot transmitting subset of base stations. Likewise, another subset of the base stations (e.g., the other base stations which are not part of the pilot transmitting subset, or some portion thereof) may transmit a pilot signal during a second base station mixed interference measurement subframe, wherein a further subset of the base stations (e.g., the base stations that transmitted a pilot signal during the first base station mixed interference measurement subframe, or some portion thereof, and/or some or all of the remaining base stations operating within the communication system, etc.) may measure or otherwise monitor the signals received from the pilot transmitting subset of base stations. An iteration of transmission and monitoring of pilot signals in mixed interference measurement subframes may thus comprise a number of subframes wherein all base stations within the communication system both transmit the mixed interference measurement pilot and monitor receiving mixed interference measurement pilot transmission by the other base stations. It should be appreciated that the mixed interference subframes in which pilots are transmitted in an iteration of transmission and monitoring of pilot signals may be non-adjacent (e.g., one or more traffic subframes may be disposed between the mixed interference subframes of an iteration of transmission and monitoring by all the base stations).

Similarly, some subset of the UEs (e.g., a random or pseudo-random subset of UEs, a subset of UEs operating in cells that are approximately evenly distributed throughout the communication system with other cells of the communication system having UEs operating therein which are not part of the subset, a subset of UEs operating in cells that are interleaved with the other cells of the communication system having UEs operating therein which are not part of the subset, etc.) may transmit a sounding reference signal (SRS) during a first UE mixed interference measurement subframe, wherein another subset of the UEs (e.g., the other UEs which are not part of the SRS transmitting subset, or some portion thereof) may measure or otherwise monitor the signals received from the SRS transmitting subset of UEs. Likewise, another subset of the UEs (e.g., the other UEs which are not part of the SRS transmitting subset, or some portion thereof) may transmit a SRS during a second UE mixed interference measurement subframe, wherein a further subset of the UEs (e.g., the UEs that transmitted a SRS during the first UE mixed interference measurement subframe, or some portion thereof, and/or some or all of the remaining UEs operating within the communication system, etc.) may measure or otherwise monitor the signals received from the SRS transmitting subset of UEs. An iteration of transmission and monitoring of SRS in mixed interference measurement subframes may thus comprise a number of subframes wherein all UEs within the communication system both transmit the mixed interference measurement SRS and monitor receiving mixed interference measurement SRS transmission by the other UEs. It should be appreciated that the mixed interference subframes in which SRS are transmitted in an iteration of transmission and monitoring of SRS signals may be non-adjacent (e.g., one or more traffic subframes may be disposed between the mixed interference subframes of an iteration of transmission and monitoring by all the UEs).

Although the foregoing examples describe the use of a mixed interference measurement protocol whereby mixed interference measurement subframes are utilized for transmission of reference signals for use in mixed interference measurements, implementations operable according to the concepts herein may utilize additional or alternative techniques for performing mixed interference measurements. For example, various network elements may operate to monitor signals received from other network elements (e.g., base stations may monitor various signals received from other base stations, UEs may monitor various signals received from other UEs, etc.) during transmissions made according to a communication protocol that is not otherwise adapted for mixed interference measurement. As one example, the network elements may operate to measure or otherwise monitor signals received from appropriate ones of the other network elements during periods at which the monitoring network element may transmit signals according to the communication protocol, but when the communication load at the monitoring network element is such that the monitoring may be implemented instead (e.g., during idle transmission subframes, where transmission may be delayed without adversely or unacceptably impacting performance or quality of service, etc.).

Mixed interference measurement as performed at block 301 of flow 300 may be performed at various times in accordance with aspects of the present disclosure. For example, mixed interference measurements may be made by base stations and/or UEs operating within a communication system periodically, such as in accordance with the timing of a mixed interference measurement protocol, based upon a temporal schedule (e.g., GPS timing signal, communication system clock, etc.), and/or the like. In operation according to an exemplary implementation, a mixed interference measurement may be made every iteration of a particular number of subframes (e.g., every X downlink and/or Y uplink subframes, wherein X and Y may be a number of subframes ranging from 2-50, for example, and wherein X and Y may or may not be the same). Additionally or alternatively, a mixed interference measurement may be made upon the occurrence of one or more events. In accordance with an exemplary implementation, one or more iterations of mixed interference measurements may be triggered by significant change events occurring within the communication system, such as one or more UEs moving within a cell (e.g., a distance sufficient to potentially alter interference with UEs in other cells, movement resulting in the UE being disposed more near or farther from a cell edge potentially altering interference with UEs in other cells, a switch in downlink and/or uplink scheduling having been implemented, etc.). A mixed interference measurement may additionally or alternatively be made randomly or pseudo-randomly, such as during periods of reduced communication traffic or other periods in which mixed interference measurement may be accommodated without undesirably impacting communication system operation.

Any or all of the foregoing mixed interference measurements may provide mixed interference measurements by all network nodes or some portion thereof. For example, where a base station mixed interference measurement is initiated, a complete iteration of base station mixed interference measurements (i.e., all base stations operating in the communication system make mixed interference measurements) may result. Similarly, where a UE mixed interference measurement is initiated, a complete iteration of UE mixed interference measurements (i.e., all UEs operating in the communication system make mixed interference measurements) may result. Alternatively, partial iterations of base station mixed interference measurements and/or UE mixed interference measurements may result (e.g., a first subset of base stations/UEs make mixed interference measurements upon one initiation whereas a second subset of base stations/UEs make mixed interference measurements upon a subsequent initiation). In another example, multiple iterations of base station mixed interference measurements and/or UE mixed interference measurements may result (e.g., all base stations/UEs operating in the communication system make multiple mixed interference measurements upon one initiation).

As previously mentioned, information regarding the mixed interference environment within the communication system may be used to provide mixed interference management in accordance with the concepts herein. Accordingly, at block 302 of flow 300 as illustrated, the network elements report mixed interference measurement information. For example, logic of eNBs 105 (e.g., logic executed by controller/processor 240) and/or logic of UEs 115 (e.g., logic executed by controller/processor 280) may implement functionality to perform reporting of mixed interference information as described herein. Reporting of the mixed interference information may occur through over-the-air signaling and/or through backhaul connections, wherein the mixed interference information reported may be directly the measured interference power level or may be information derived therefrom.

In operation of an example herein, each UE reports mixed interference measurement information to its serving base station, wherein the mixed interference information comprises information provided by or otherwise derived from the monitoring of other UEs (e.g., UE-to-UE interference) in accordance with operation at block 301. Similarly, base stations exchange mixed interference measurement information, wherein the mixed interference information comprises information provided by or otherwise derived from the monitoring of other base stations (e.g., base station-to-base station interference) in accordance with operation at block 301. Moreover, the mixed interference information exchanged by the base stations in accordance with aspects of the present disclosure include information provided by or otherwise derived from the UEs served by that base station monitoring of other UEs (e.g., UE-to-UE interference). The mixed information as reported by any such network element provides a mixed interference profile for that network element as may be used in performing aspects of mixed interference management according to the concepts herein.

The exchange of mixed interference information by base stations may comprise all base stations of a communication system reporting their mixed interference information (e.g., mixed interference information measured by the reporting base station as well as mixed interference information reported to that base station by UEs served by that base station) to all other base stations of the communication system. Alternatively, the exchange of mixed interference information by base stations may comprise base stations reporting to subsets of the base stations of a communication system. For example, base stations may report mixed interference information only to other base stations associated with mixed interference, or some threshold amount thereof, being measured by the reporting base station and/or one or more of the UEs served thereby. The reporting of mixed interference information to such subsets of base stations may be advantageous in reducing or minimizing data communication between the base stations. For example, reporting of the mixed interference information may be provided though wireless links, such as using radio frequency spectrum also utilized in carrying traffic channels. Accordingly, minimizing the data communication between base stations for such reporting may be desirable so as to reduce the impact upon traffic carrying capacity in the communication network. Additionally or alternatively, backhaul links (e.g., wireline connections, fiber optic connections, out of band wireless connections, etc.) may be utilized for reporting the mixed interference information between the base stations. In operation according to some example implementations, such backhaul links may be utilized to carry more robust mixed interference information, if desired.

The particular mixed interference information reported may likewise be selected or otherwise configured to reduce or otherwise minimize the data communication between the base stations and/or between the UEs and base stations. For example, the measurements made by the UEs and/or base stations, such as may comprise signal strength information and signal source identification (e.g., transmitting station identifier, such as base station identification information or UE identification information), perhaps accompanied by other relevant or otherwise useful information (e.g., location at which the measurement was made, time at which the measurement was made, etc.), may be provided in the mixed interference information reports. Additionally or alternatively, information derived from the measurements made by the UEs and/or base stations may be provided in the mixed interference information reports. For example, such derived information may comprise whether or not the signal received from an interfering station exceeds a threshold (e.g., a mixed interference tolerance threshold), information indicating that the measured interference is unacceptable to the reporting receiver, information regarding an amount of signal power back-off needed for the interference to be acceptable to the reporting receiver, location and/or direction information (e.g., relative location of a UE computed from base station receiving antenna direction, received signal strength, timing offset, etc.), and/or the like. Such derived information may be reported alone or in combination with the aforementioned measurements made by the UEs and/or base stations. For example, one or more of the foregoing derived information may be reported without including the corresponding measurements made to reduce or otherwise minimize the data communication between the base stations and/or between the UEs and base stations.

As described above, implementations in accordance with the concepts herein may utilize thresholds in deriving mixed interference information. Such thresholds may comprise a variety of different threshold metrics and/or magnitudes. For example, a mixed interference tolerance threshold may comprise a predetermined magnitude of interference (e.g., as measured by interference over thermal (IoT)) considered acceptable by a receiving station in operation of a particular communication system. Using such a threshold, a reporting network element may operate to provide a report including mixed interference information for each transmitting station for which measurements by the reporting network element exceeded the threshold value. The report may include the measurements, the amount by which the threshold was exceeded, information indicating that the threshold was exceeded, a magnitude of transmit power back-off needed so as not to exceed the threshold, information regarding the location or relative location and/or channel fade estimate of the reporting network element for use in beam forming, null steering, or directional beam selection so as to avoid instances of mixed interference, and/or other information as described above.

Also as described above, implementations in accordance with the concepts herein may utilize information regarding a level of transmit power back-off so as to avoid unacceptable or otherwise undesirable mixed interference. Such back-off information may be computed from an amount by which a threshold magnitude has been exceeded (e.g., an amount by which the foregoing mixed interference tolerance threshold is exceeded by a signal received from a particular transmitting network element). Additionally or alternatively, such back-off information may be determined for achieving a particular result. For example, in an uplink-to-downlink interference scenario, the reporting UE or a base station to which the UE reports may compute a back-off sufficient to avoid base station jamming otherwise resulting from the downlink/uplink mismatch at two UEs. In a downlink-to-uplink interference scenario, the reporting base station may compute a back-off sufficient to avoid receive de-sense otherwise resulting at the base station receiver.

In implementations according to aspects of the present disclosure, a base station may configure and/or control its UEs to report the measured mixed interference information (e.g., UE-to-UE mixed interference measurements) based on the occurrence of certain measurement events. Embodiments may provide signaling between various of the devices (e.g., from a base station to one or more UEs and/or one or more other base station) to configure such devices to measure mixed interference information and/or report measured mixed interference information in response to or in association with one or more particular events as may be detected by the base station and/or UEs. Additionally or alternatively, embodiments may provide signaling between various of the devices to control reporting of mixed interference information in response to or in association with one or more particular events as may be detected by the base station or the UEs. For example, a significant change in the interference from a particular UE may trigger a report. A report by a UE of its measured mixed interference may also be triggered based on the occurrence of mobility related events such as handover and reselection. Such mobility related reporting may be advantageous in light of the UE-to-UE interference for pairs of UEs, where each UE in the pair is under a different cell, potentially significantly changing with handover events (e.g., resulting in changing the set of such pairs) or otherwise resulting in appreciable changes to the mixed interference environment. In implementations according to aspects of the present disclosure, a base station may also exchange mixed interference information measured by the base station and that reported by UEs with other base stations. This exchange of mixed interference information may, for example, be triggered based on configured measurement events and/or mobility related events.

Accordingly, it should be appreciated that, although the illustrated example of flow 300 shows an instance of measurement of mixed interference at block 301 followed by an instance of reporting of mixed interference information at block 302, the measurement and reporting of mixed interference in accordance with the concepts herein may be in accordance with various scheduling (e.g., measurement and reporting may follow the same schedule and/or different schedules). For example, mixed interference measurements may be made by the various network elements according to a measurement schedule (e.g., periodically, upon the occurrence of one or more events, at random or pseudo-random times, etc.) while mixed interference information reporting may be performed by the various network elements according to a reporting schedule (e.g., periodically, upon the occurrence of one or more events, at random or pseudo-random times, etc.), wherein the measurement schedule and the reporting schedule may be cooperative or independent. Accordingly, measurement and reporting implemented according to the concepts herein may be performed asynchronously with respect to one another or otherwise according to differing schedules. It should be appreciated that even where a measurement schedule and a reporting schedule utilize a same metric for initiation (e.g., time, event, etc.), the particular values of the metric(s) utilized may differ to thereby result in the measurement and reporting being performed asynchronously.

The aforementioned asynchronous measurement and reporting may result in multiple measurements having been made between reporting by a network element, or perhaps no new measurements having been made between reporting by a network element. In accordance with some examples herein, a network element may operate to report all suitable measurements (and/or information derived therefrom) at a next reporting instance. Alternatively, a network element may operate to report only the most recent measurements (and/or information derived therefrom) at a next reporting instance. Where a network element has not made new measurements since the last instance of reporting, the network element may re-report the previous measurements (and/or information derived therefrom) at a next reporting instance. Alternatively, a network element that has not made new measurements since the last instance of reporting may operate to provide no reporting at a next reporting instance, such as to reduce or otherwise minimize the data communication between the network elements.

As previously mentioned, information regarding the mixed interference environment within the communication system may be used to provide mixed interference management in accordance with the concepts herein. For example, information regarding the mixed interference profiles of other network elements in the communication system may be utilized by a base station to construct a jamming graph utilized in aspects of mixed interference management according to the concepts herein. Accordingly, at block 303 of flow 300 as illustrated, mixed information reported to a base station (e.g., including mixed interference information provided by the UEs served by the base station and mixed interference information provided by other base stations) is used to generate (or update a previously generated) jamming graph. For example, logic of eNBs 105 (e.g., logic executed by controller/processor 240) and/or logic of UEs 115 (e.g., logic executed by controller/processor 280) may implement functionality to generate and/or update jamming graphs using mixed interference measurement information as described herein.

An exemplary jamming graph provided in accordance with the concepts herein contains information that can be used to evaluate the impact of a scheduling decision that might result in a mixed interference scenario (i.e., where some cells operate in uplink and other cells operate in downlink simultaneously). Accordingly, based on the mixed interference measurement information reported, a base station operating in accordance with aspects of the present disclosure can generate a jamming graph that summarizes the mixed interference profile relevant to the operations of that base station. The downlink-to-uplink and uplink-to-downlink mixed interference may be summarized in the form of one or more jamming graphs (e.g., base station-to-base station jamming graphs and/or UE-to-UE jamming graphs) provided according to an aspect of the present disclosure.

In an exemplary base station-to-base station jamming graph, such as may be utilized with respect to downlink-to-uplink mixed interference management decisions, one vertex is provided for every base station or every relevant base station (e.g., base stations disposed in the communication system such that they are likely or capable of introducing unacceptable or undesirable interference with respect to the base station generating the jamming graph, or for which the jamming graph is generated). For example, one base station (e.g., $BS_i$) may be connected to another base station (e.g., $BS_1$) in the jamming graph where the signal transmitted from that base station results in unacceptable or undesirable interference with respect to the other base station. In an exemplary implementation where a mixed interference tolerance threshold (e.g., a tolerable IoT threshold (BS_TOLERABLE_IOT)) is used, $BS_i$ is connected to $BS_j$ if the maximum (Max_IoT) measured for $BS_i$ at $BS_j$ is greater than the mixed interference tolerance threshold (e.g., Max_IoT at $BS_j$ for $BS_i$>BS_TOLERABLE_IOT of $BS_j$). Such connections represent instances of downlink-to-uplink mixed interference sufficient to undesirably or unacceptably interfere with communications where asynchronous downlink and uplink scheduling is implemented as between the connected base stations. These connections (also referred to as edges herein) between base stations may be represented in a base station-to-base station jamming graph as a line or link between the base stations. The connections or edges represented in the base station-to-base station jamming graph may have a label associated therewith, wherein the label provides information regarding the connection (e.g., the measured mixed interference power level as measured by the receiving base station, a back-off power level for avoiding the mixed interference, etc.). For example, the labels of edges provided in a base station-to-base station jamming graph implemented according to some aspects of the disclosure comprise the transmit power (e.g., TX-power/EIRP) back-off needed at $BS_i$ to ensure that the IoT at $BS_j$ due to $BS_i$ becomes equal to (or less than) the BS_TOLERABLE_IOT of $BS_j$.

In an exemplary UE-to-UE jamming graph, such as may be utilized with respect to uplink-to-downlink mixed interference management decisions, one vertex is provided for every UE or every relevant UE (e.g., UEs disposed in the communication system such that they are likely or capable of introducing unacceptable or undesirable interference with respect to the UEs served by the base station generating the jamming graph, or for which the jamming graph is generated). For example, one UE (e.g., $UE_i$) may be connected to another UE (e.g., $UE_j$) in the jamming graph where the signal transmitted from that UE results in unacceptable or undesirable interference with respect to the other UE. In an exemplary implementation where a mixed interference tolerance threshold (e.g., a tolerable IoT threshold (UE_TOLERABLE_IOT)) is used, $UE_i$ is connected to $UE_j$ if the maximum (Max_IoT) measured for $UE_j$ at $UE_i$ is greater than the mixed interference tolerance threshold (e.g., Max_IoT at $UE_i$ for $UE_i$>UE_TOLERABLE_IOT of $UE_j$). Such connections represent instances of uplink-to-downlink mixed interference sufficient to undesirably or unacceptably interfere with communications where asynchronous uplink and downlink scheduling is implemented as between the connected UEs. Similar to the base station-to-base station jamming graphs discussed above, these connections (also referred to as edges herein) between UEs may be represented in a UE-to-UE jamming graph as a line or link between the UEs. The connections or edges represented in the UE-to-UE jamming graph may also have a label associated therewith, wherein the label provides information regarding the connection (e.g., the measured mixed interference power level as measured by the receiving UE, a back-off power level for avoiding the mixed interference, etc.). For example, the labels of edges provided in a UE-to-UE jamming graph implemented according to some aspects of the disclosure comprise the transmit power (e.g., TX-power/EIRP) back-off needed at $UE_i$ to ensure that the IoT at $UE_j$ due to $UE_i$ becomes equal to (or less than) the UE_TOLERABLE_IOT of $UE_j$.

As discussed above, the mixed interference information reported by base stations and/or UEs may be directly the measured interference power level or may be information derived therefrom. In accordance with aspects of the present disclosure, such mixed interference information derived from the mixed interference measurements may comprise an indication of the presence of an edge in the jamming graph, such as may be generated based on the measured mixed interference power level. The reporting of such edge information may be used to provide reduced or otherwise efficient communication of mixed interference information while facilitating the generation of jamming graphs as described herein.

Figure 4A:
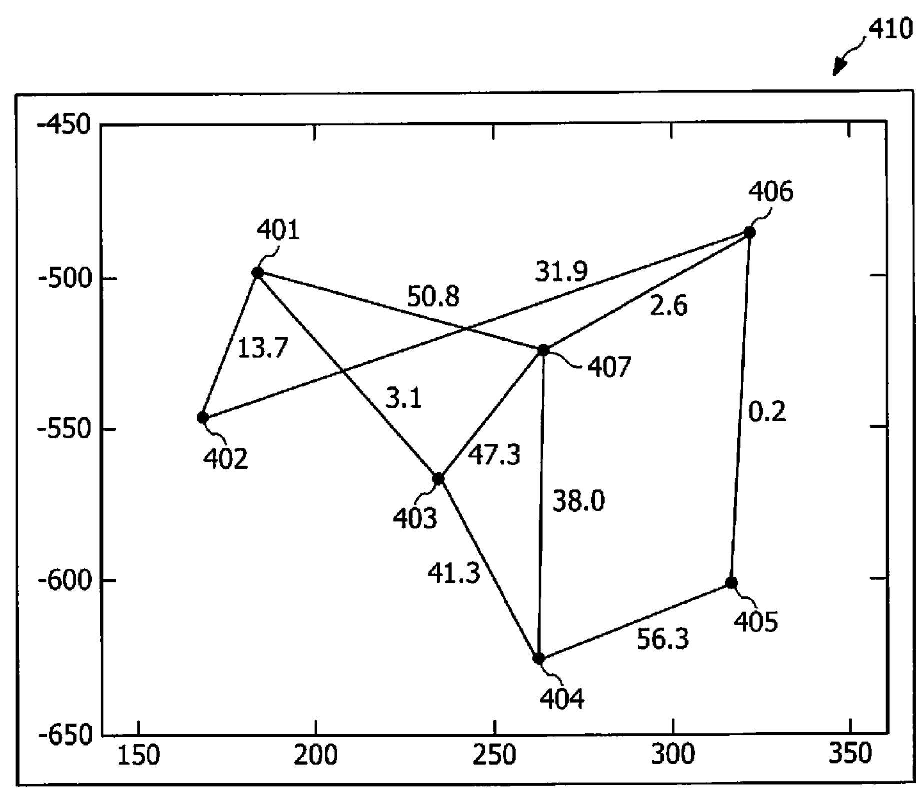
FIGS. 4A and 4B show example jamming graphs according to one aspect of the present disclosure.
Figure 4B:
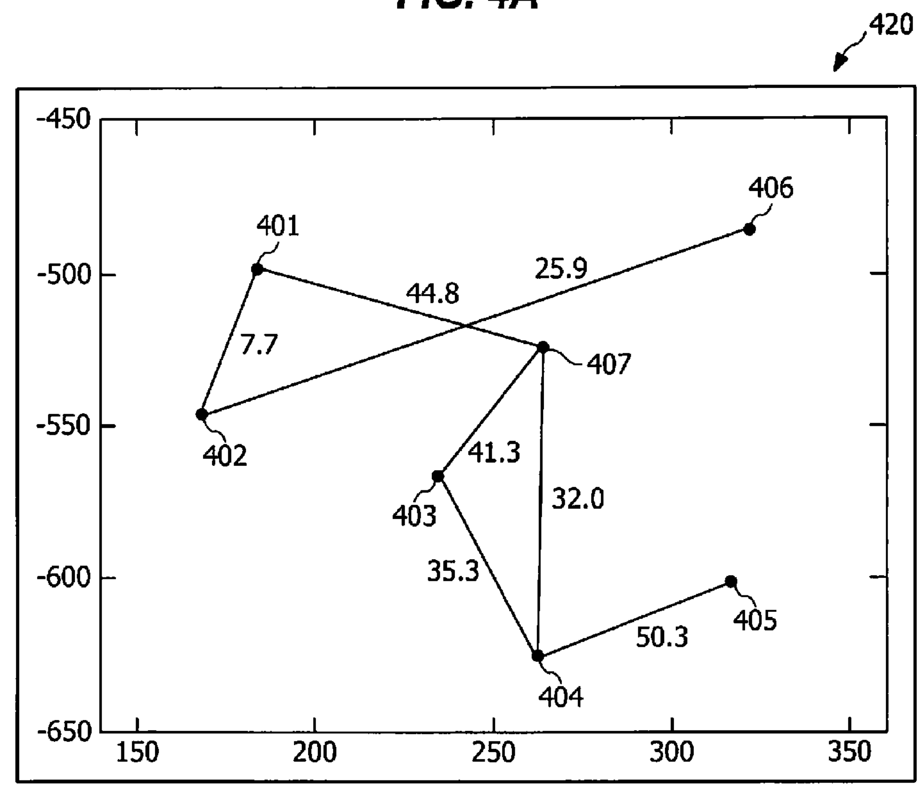

Example jamming graphs, as may be provided in operation of exemplary implementations, are shown in FIGS. 4A and 4B. The example of FIG. 4A shows a global view of a base station-to-base station jamming graph as base station-to-base station jamming graph 410, such as may be generated from the mixed interference information provided in accordance with flow 300 described above. In the illustrated example of base station-to-base station jamming graph 410, vertices 401-407 represent the base stations of the communication system. The aforementioned edges, representing instances of uplink-to-downlink mixed interference sufficient to undesirably or unacceptably interfere with communications, are shown by the lines connecting particular ones of the vertices. The aforementioned labels, representing a back-off power level in dB for avoiding the mixed interference, are shown by the numbers associated with each of the illustrated edges. For example, the labels of the illustrated example show the power back-off needed to meet a 3 dB tolerable limit of interference over thermal noise.

In some implementations, each base station may only learn about and use the information about edges directly connected to it. Accordingly, a base station-to-base station jamming graph generated by such a base station (or for which the jamming graph was generated) might only include the edges directly connected to that base station. However, in another implementations, a base station may also learn about edges between other base stations, possibly restricted to neighbors only. Accordingly, a base station-to-base station jamming graph generated by such a base station may include edges connecting base station pairs that do not include the base station that generated the jamming graph (or for which the jamming graph was generated). As an example, this may enable the base station to predict whether the neighbor base station will be able to convert direction, and may incorporate this information into its own analysis of the interference environment.

The example of FIG. 4B shows base station-to-base station jamming graph 420 regenerated from the mixed interference information utilized in generating base station-to-base station jamming graph 410 of FIG. 4A with a 6 dB transmission power back-off. As can be seen in the example illustrated in FIG. 4B, this 6 dB power back-off results in some of the edges (e.g., the edges between vertices 401 and 403, between vertices 405 and 406, and between vertices 406 and 407) being eliminated, thereby indicating that the power back-off is sufficient to avoid undesired or unacceptable uplink-to-downlink mixed interference between the base stations represented by those vertices. It should be appreciated that labels shown in base station-to-base station jamming graph 420 of FIG. 4B are likewise updated to show the further power back-off needed to meet a 3 dB tolerable limit of interference over thermal noise with respect to the remaining edges.

Although the example jamming graphs illustrated in FIGS. 4A and 4B have been described above with reference to base station-to-base station jamming graph implementations, UE-to-UE jamming graphs implementations may be qualitatively similar to the jamming graphs shown. However, the vertices in an implementation of a UE-to-UE jamming graph represent UEs, and thus their locations within the jamming graph would correspond to UE representations. Similarly, the edges and labels would correspond to those of the UE downlink-to-uplink mixed interference information. The UE-to-UE jamming graph of some implementations may additionally include information regarding which cell each UE belongs to, such as may be included as a label for the vertex of the corresponding UE.

As can be appreciated from the foregoing, jamming graphs provided according to the concepts herein may be utilized to determine if a switch in downlink and/or uplink scheduling is to be implemented, such as to accommodate additional traffic in the downlink or uplink, to increase downlink or uplink throughput, to meet quality of service (QoS) metrics, to efficiently utilize the spectrum, etc. Accordingly, jamming graphs in accordance with the foregoing are incorporated into the scheduling decisions according to implementations herein, such as to minimize the impact due to mixed interference. As an example, scheduler 244 of eNBs 105 operating in accordance with the concepts herein may analyze the impact of downlink and uplink scheduling changes prior to their being implemented and, based on such analysis, implement dynamic switching of downlink and/or uplink slots without introducing unacceptable mixed interference. Such analysis and implementation of dynamic switching of downlink and/or uplink slots may include analyzing and/or implementing power back-off, such as through the regeneration of jamming graphs with a power back-off.

For example, using jamming graph according to the concepts herein, each base station can evaluate the cost and benefit of scheduling an uplink versus downlink transmission. In accordance with some implementations, the interference profile of one or more jamming graphs can be used to compute a scheduler metric (e.g., a proportional fair scheduler metric) that takes into account the mixed interference, wherein the decision of uplink versus downlink transmission may be based on the scheduler metric (e.g., by comparing which decision provides a higher value for the scheduler metric). For example, if there is traffic waiting to be scheduled only in one direction out of the downlink and uplink, the scheduler may opportunistically select that direction. As another example, if the intended receiver will be jammed by a strong interferer, then selection of that direction will be avoided by the scheduler. It should be appreciated that, although a proportional fair scheduler metric is discussed above, a scheduler may use a variety of different scheduler metrics depending upon the particular implementation.

Figure 5:
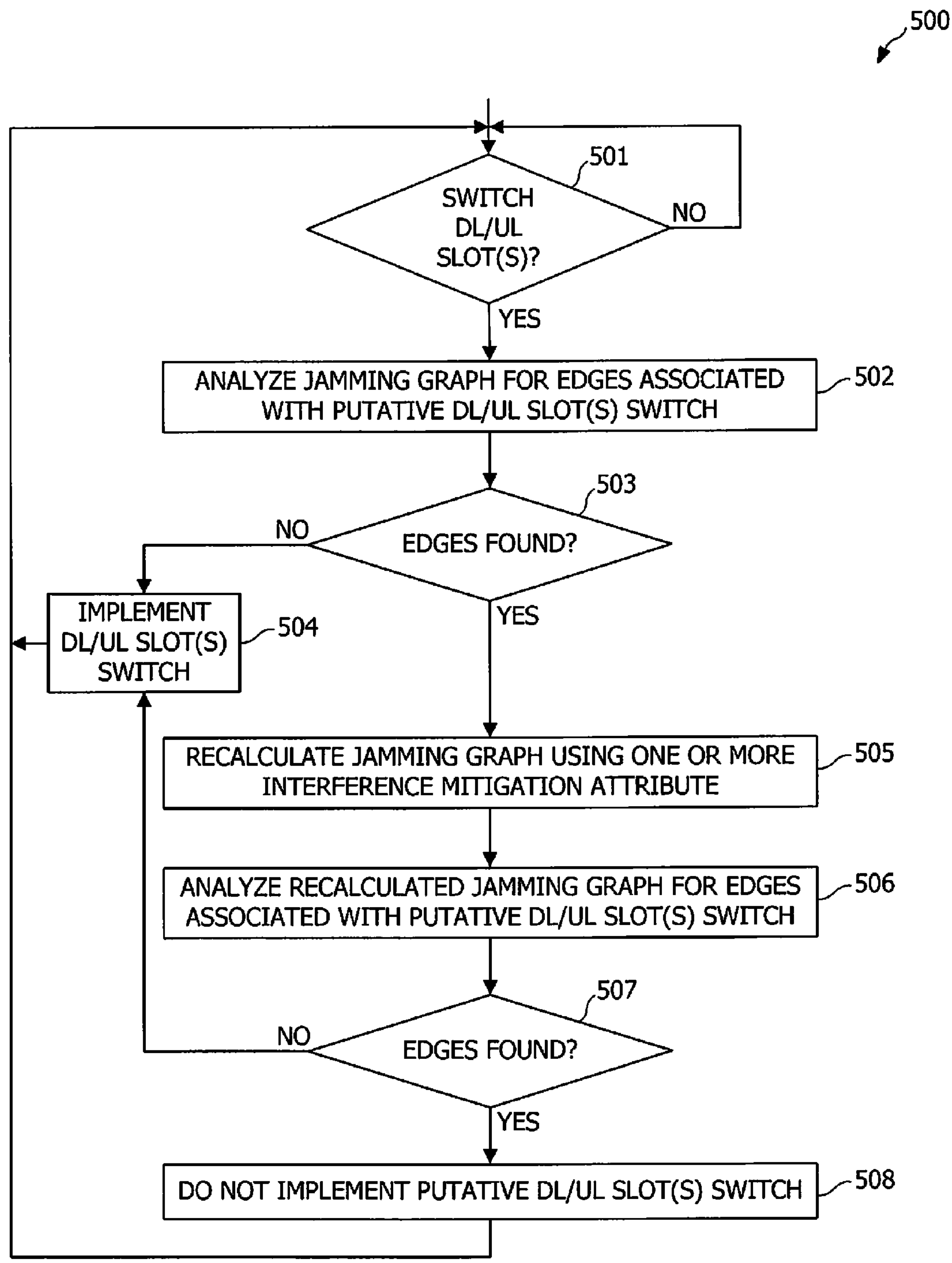
FIG. 5 shows a high level flow diagram of operation for mixed interference management according to one aspect of the present disclosure.

FIG. 5 shows a high level flow diagram of operation for mixed interference management in accordance with the concepts herein. In particular, flow 500 illustrates functions as may be performed by controller/processor 240 and/or scheduler 244 at eNB 105 and/or controller/processor 280 at UE 115 in providing mixed interference management operation.

At block 501 of flow 500 as illustrated, a determination is made as to whether switching an uplink subframe to downlink or vice versa is permitted (e.g., the network configuration may indicate that the direction cannot be switched) and desirable (e.g., traffic waiting to be scheduled only in one direction out of the downlink and uplink, either the downlink or uplink is in high demand while the other link is in low demand, etc.). If it is determined that switching an uplink or downlink subframe is not permitted and desired at this time, processing according to the illustrated example returns to block 501 for a determination at a subsequent time. However, if it is determined that switching an uplink or downlink subframe is permitted and desired at this time, processing according to the illustrated example proceeds to block 502 for operation do determine whether switching an uplink subframe to downlink or vice versa is beneficial (e.g., whether unacceptable or undesirable mixed interference would result).

One or more jamming graphs are analyzed at block 502 of the illustrated example for determining if switching an uplink or downlink subframe is to be performed. For example, in accordance with aspects of the present disclosure, each base station may compare different mixed interference mitigation strategies. If a transmission in one cell is identified to cause unacceptable or otherwise undesirable mixed interference to a neighboring cell's transmission in the opposite direction or vice versa, the scheduler may, for example, choose to avoid such a transmission, proceed with such a transmission with a suitable transmit power back-off (e.g., applied at the base station for downlink or signaled to the UE for uplink), proceed with such a transmission with a suitable change in transmit beamforming (e.g., applied at the base station for downlink or signaled to the UE for uplink). To evaluate such strategies, the scheduler may regenerate the jamming graph taking into account the changes to be made (e.g., transmit power back-off, transmit beamforming, etc.) and proceed to analyze the resulting jamming graph.

In accordance with the foregoing, the illustrated example of flow 500 operates to analyze the relevant jamming graph(s) for edges associated with a putative uplink or downlink subframe switch at block 502. Accordingly, at block 503 of the illustrated example a determination is made as to whether edges relevant to the putative uplink or downlink subframe switch were found in a jamming graph. For example, in a putative uplink to downlink switch, the base station-to-base station jamming graph will advise on interference caused by the current base station at neighbor base stations, while the UE-to-UE jamming graph will advise on interference caused by neighbor UEs on currently scheduled UE. Similarly, in a putative downlink to uplink switch, the UE-to-UE jamming graph will advise on interference caused by the currently scheduled UE to neighbor UEs, while the base station-to-base station jamming graph will advise on interference caused by neighbor base stations on the current base station. Accordingly, the base station-to-base station jamming graph may be analyzed to determine if edges are present with respect to the base station for which the putative switch is to be made (e.g., one or more edges connecting that base station with other base stations in the communication system), thus indicating potential unacceptable or undesirable mixed interference resulting from the switch and the UE-to-UE jamming graph may be analyzed to determine if edges are present with respect to the UEs served by the base station for which the putative switch is to be made (e.g., one or more edges connecting any of those UEs with UEs served by other base stations in the communication system), thus indicating potential unacceptable or undesirable mixed interference resulting from the switch.

If it is determined at block 503 that no edges are present in the jamming graph(s) for the putative switch, and thus no unacceptable or undesired mixed interference is likely to result, processing according to the illustrated example of flow 500 proceeds to block 504. At block 504 the uplink or downlink subframe switch is implemented by the scheduler, whereby mixed interference management has been provided by controlling implementing the switch after a determination that unacceptable or otherwise undesired mixed interference will not result, and processing returns to block 501 for subsequent determinations whether switching an uplink or downlink subframe is desired.

If, however, it is determined at block 503 that one or more edges are present in the jamming graph(s) for the putative switch, and thus unacceptable or undesired mixed interference is likely to result, processing according to the illustrated example of flow 500 proceeds to block 505. At block 505 the jamming graph(s) is regenerated using one or more interference mitigation strategy. For example, one or more jamming graphs may be regenerated with a transmit back-off, wherein the transmit back-off may be determined to provide a transmission power level sufficient to serve the communications for which the putative switch is to be made but which results decreased mixed interference.

In operation according to some implementations, for example, a mixed interference mitigation strategy may provide for a base station applying a power adjustment (e.g., transmit power back-off at one or more network elements and/or transmit power increase at one or more network elements) to reduce mixed interference impact on other base stations. For example, if the mixed interference impact is in the incoming direction (e.g., from a neighbor cell to the current cell), some implementations may provide for transmit power increase in the current cell to accommodate the subframe direction switch. If, however, the mixed interference impact is in the outgoing direction (e.g., from the current cell to a neighbor cell), some implementations may provide for transmit power back-off in the current cell to accommodate a subframe direction switch. As an example, if the current cell is converting from downlink to uplink, and the received signal level from a neighboring base station is too high, the current cell UE may be controlled to boost its transmit power to overcome the interference. Additionally or alternatively, if the current cell is converting from downlink to uplink, a mixed interference mitigation strategy may provide for a UE applying a transmit power back-off (e.g., the transmit power back-off value may be the highest value needed to remove all outgoing edges, up to a limit of MAX_BACKOFF_UE) to reduce mixed interference impact on other UEs. In accordance with an example of such a mixed interference mitigation strategy, power adjustment may be applied only if it removes at least one outgoing edge. As another example, if the current cell is converting from uplink to downlink, and the current base station signal as received by a UE in a neighbor cell is too high, the neighbor base station may be controlled to boost its transmit power to overcome the interference. Additionally or alternatively, if the current cell is converting from uplink to downlink, a mixed interference mitigation strategy may provide for the current base station applying a transmit power back-off (e.g., the transmit power back-off value may be the highest value needed to remove all outgoing edges, up to a limit of MAX_BACKOFF_BS) to reduce mixed interference impact on other base stations. The base stations (e.g., logic of scheduler 244) may calculate the back-off that will be applied by each network element, and can regenerate the jamming graph (e.g., compute a new sparser jamming graph) in a decentralized manner.

The one or more regenerated jamming graphs are analyzed at block 506 of the illustrated example for determining if switching an uplink or downlink subframe is to be performed in light of the mixed interference mitigation strategy. If a transmission in one cell is identified to cause unacceptable or otherwise undesirable mixed interference to a neighboring cell's transmission in the opposite direction or vice versa despite the application of one or more mitigation strategy, as reflected by the regenerated jamming graph(s), the scheduler may choose to avoid such a transmission. Accordingly, at block 507 of the illustrated example, a determination is made as to whether edges relevant to the putative uplink or downlink subframe switch were found in a regenerated jamming graph. For example, if a switch of an uplink subframe to instead provide a downlink subframe, the regenerated base station-to-base station jamming graph and UE-to-UE jamming graph may be analyzed to determine if edges are present for the putative switch, thus indicating potential unacceptable or undesirable mixed interference resulting from the switch even with the interference mitigation. Similarly, if a switch of a downlink subframe to instead provide an uplink subframe, the regenerated base station-to-base station jamming graph and UE-to-UE jamming graph may be analyzed to determine if edges are present for the putative switch, thus indicating potential unacceptable or undesirable mixed interference resulting from the switch even with the interference mitigation.

If it is determined at block 507 that one or more edges are present in the regenerated jamming graph(s) for the putative switch, and thus unacceptable or undesired mixed interference is likely to result, processing according to the illustrated example of flow 500 proceeds to block 508. At block 508 the scheduler does not implement the putative uplink or downlink switch, and instead returns to block 501 for subsequent determinations whether switching an uplink or downlink subframe is desired. In operation according to implementations herein, action may nevertheless be taken in order to attempt to provide or otherwise accommodate an uplink or downlink subframe switch. For example, the base station may communicate with one or more network elements to control or request operational changes (e.g., transmit power back-off, beam forming adjustment, uplink or downlink subframe switching, etc.) for implementing or facilitating uplink or downlink switching.

If, however, it is determined at block 507 that no edges are present in the regenerated jamming graph(s) for the putative switch, and thus no unacceptable or undesired mixed interference is likely to result, processing according to the illustrated example of flow 500 proceeds to block 504. For example, at block 504 the uplink or downlink subframe switch in combination with the one or more interference mitigation strategy used in regenerating the jamming graph(s) may be implemented by the scheduler, whereby mixed interference management has been provided by controlling implementing the switch with a corresponding mixed interference mitigation strategy after a determination that unacceptable or otherwise undesired mixed interference will not result. In accordance with some implementations, operations performed at block 504 of flow 500 may comprise analysis in addition to or in the alternative to the foregoing may be utilized. For example, logic of the scheduler may determine whether to implement the switch, which has been determined to be possible in view of the mixed interference environment but which may otherwise not be desirable or advantageous. In an exemplary implementation, such analysis may reveal that, after applying power back-off to mitigate interference, the resulting throughput may be so low that the switch may not provide desired results and thus the scheduler may decide to not implement the switch. After processing at block 504 of the illustrated example, processing returns to block 501 for subsequent determinations whether switching an uplink or downlink subframe is desired.

It should be appreciated that implementing the uplink or downlink subframe switch at block 504 may comprise operations in addition to the subframe switch and associated mixed interference mitigation strategy. For example, various operations, functions, communications, etc. may correspondingly be implemented. Where transmit power back-off is implemented, for example, a modulation coding scheme (MCS) and/or other communication attributes may be controlled/changed to compensate for the power back-off.

From the above described exemplary implementations it can readily be seen that operation according to the concepts herein enable a scheduler (e.g., scheduler 244 of eNBs 105) to become aware of the mixed interference profiles and thereby compute the jamming graph. This in turn may be used to evaluate the impact of a decision to convert the direction of a nominally downlink subframe to uplink or vice versa. Thus, a base station is enabled to limit the impact of mixed interference by selecting between uplink and downlink direction, and adjusting the transmit beam-forming and/or transmit power based on the mixed interference measurement report.

The foregoing concepts are applicable with respect to a number of communication system and network element configurations. For example, the exemplary implementations discussed may be utilized with respect to network elements having single input single output (SISO), single input multiple output (SIMO), multiple input single output (MISO), and/or multiple input multiple output (MIMO) configurations. With MIMO beamforming, uplink-downlink mixed interference is likely to have less impact due in part because transmit beamforming allows the transmitter to control the directionality of its signal, receiver nulling allows the receiver to emphasize its desired signal over the interference, and/or 3D antenna array configuration allows further interference rejection due to elevation angular separation. Nevertheless, the use of jamming graph for a MIMO configuration is similar to that of a SISO configuration. A few refinements to be considered with respect to a MIMO configuration, however, include the beamforming direction may be selected keeping mixed interference in mind to reduce jamming impact (e.g., the beam selection may be performed in a way that maximizes the signal to leakage ratio), the IoT resulting from the best beam direction should be compared with the tolerable IoT to determine the power back-off, and the IoT computation should take into account the MIMO beamforming, receiver nulling and elevation angular separation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3 and 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:

receiving, by a base station, mixed interference information, from at least one of one or more user equipments (UEs) in communication with the base station or from one or more other base stations, that comprises information regarding at least one of downlink-to-uplink or uplink-to-downlink interference experienced by a respective reporting one of the one or more UEs and one or more other base stations; and managing, by the base station, communications with the at least one of one or more UEs in communication with the base station using the mixed interference information.

2. The method of claim 1, further comprising:

determining, by a scheduler of the base station, to switch an uplink subframe to a downlink subframe or to switch a downlink subframe to an uplink subframe based on the mixed interference information.

3. The method of claim 1, further comprising:

determining, by a scheduler of the base station, to switch an uplink subframe to a downlink subframe or to switch a downlink subframe to an uplink subframe based on the mixed interference information and to perform a transmit power adjustment interference mitigation operation based on the mixed interference information.

4. The method of claim 1, further comprising:

determining, by a scheduler of the base station, to switch an uplink subframe to a downlink subframe or to switch a downlink subframe to an uplink subframe based on the mixed interference information and to perform a beam forming adjustment interference mitigation operation based on the mixed interference information.

5. The method of claim 1, further comprising:

generating jamming data, using the mixed interference information, that provides a mixed interference profile for the base station that is used in the managing communications with the at least one of the one or more UEs.

6. The method of claim 5, wherein the jamming data comprises at least one of base station-to-base station jamming data indicating connections between pairs of base stations experiencing undesirable mixed interference with respect to one another or UE-to-UE jamming data indicating connections between pairs UEs experiencing undesirable mixed interference with respect to one another.

7. The method of claim 6, wherein the base station-to-base station jamming data comprises a base station-to-base station jamming graph having vertices corresponding to the base station and the one or more other base stations and indicating connections between pairs of vertices of the vertices where base stations corresponding to the pairs of vertices are indicated in the mixed interference information as experiencing undesirable downlink-to-uplink or uplink-to-downlink interference with respect to one another.

8. The method of claim 6, wherein the UE-to-UE jamming data comprises a UE-to-UE jamming graph having vertices corresponding to the UEs served by the base station and one or more UEs served by the one or more other base stations and indicating connections between pairs of vertices of the vertices where UEs corresponding to the pairs of vertices are indicated in the mixed interference information as experiencing undesirable downlink-to-uplink or uplink-to-downlink interference with respect to one another.

9. The method of claim 5, wherein the jamming data comprises a transmit power level adjustment value associated with each communication connection represented in the jamming data.

10. The method of claim 5, wherein the managing communications with the at least one of one or more UEs includes switching, based on the jamming data, a time division duplex (TDD) subframe of the base station independent of TDD subframe scheduling implemented by the one or more other base stations.

11. The method of claim 5, further comprising:

analyzing, by a scheduler of the base station, the mixed interference profile in association with a putative switch of an uplink subframe to a downlink subframe or a switch of a downlink subframe to an uplink subframe;

regenerating, by the scheduler, the jamming data using the mixed interference information and a mixed interference mitigation operation, wherein the regenerated jamming data provides an interference mitigated mixed interference profile for the base station; and determining, by the scheduler, to switch an uplink subframe to a downlink subframe or to switch a downlink subframe to an uplink subframe based on the interference mitigated mixed interference profile.

12. The method of claim 11, wherein the mixed interference mitigation operation is selected from the group consisting of a transmit power adjustment and a beam forming adjustment.

13. The method of claim 1, further comprising:

controlling the at least one of the one or more UEs or the one or more other base stations to report the mixed interference information based on at least one of a measurement event or a mobility related event.

14. The method of claim 1, wherein the mixed interference information reported by the one or more other base stations comprises mixed interference information reported to a respective one of the one or more other base stations by one or more UEs in communication with that respective one of the one or more other base stations.

15. A non-transitory computer-readable medium having program code recorded thereon, the program code comprising:

program code for causing a computer to:

receive, by a base station, mixed interference information, from at least one of one or more user equipments (UEs) in communication with the base station or from one or more other base stations, that comprises information regarding at least one of downlink-to-uplink or uplink-to-downlink interference experienced by a respective reporting one of the one or more UEs and one or more other base stations; and manage, by the base station, communications with the at least one of one or more UEs in communication with the base station using the mixed interference information.

16. The non-transitory computer-readable medium of claim 15, wherein the program code further causes the computer to:

determine, by a scheduler of the base station, to switch an uplink subframe to a downlink subframe or to switch a downlink subframe to an uplink subframe based on the mixed interference information.

17. The non-transitory computer-readable medium of claim 15, wherein the program code further causes the computer to:

generate jamming data, using the mixed interference information, that provides a mixed interference profile for the base station that is used in managing communications with the at least one of the one or more UEs.

18. The non-transitory computer-readable medium of claim 17, wherein the jamming data comprises a transmit power level adjustment value associated with each communication connection represented in the jamming data.

19. The non-transitory computer-readable medium of claim 17, wherein the program code further causes the computer to:

analyze, by a scheduler of the base station, the mixed interference profile in association with a putative switch of an uplink subframe to a downlink subframe or a switch of a downlink subframe to an uplink subframe;

regenerate, by the scheduler, the jamming data using the mixed interference information and a mixed interference mitigation operation, wherein the regenerated jamming data provides an interference mitigated mixed interference profile for the base station; and determine, by the scheduler, to switch an uplink subframe to a downlink subframe or to switch a downlink subframe to an uplink subframe based on the interference mitigated mixed interference profile.

20. An apparatus comprising:

at least one processor; and a memory coupled to the at least one processor, wherein the at least one processor is configured:

to receive, by a base station, mixed interference information, from at least one of one or more user equipments (UEs) in communication with the base station or from one or more other base stations, that comprises information regarding at least one of downlink-to-uplink or uplink-to-downlink interference experienced by a respective reporting one of the one or more UEs and one or more other base stations; and to manage, by the base station, communications with the at least one of the one or more UEs in communication with the base station using the mixed interference information.

21. The apparatus of claim 20, further configured:

to determine, by a scheduler of the base station, to switch an uplink subframe to a downlink subframe or to switch a downlink subframe to an uplink subframe based the mixed interference information.

22. The apparatus of claim 20, further configured:

to determine, by a scheduler of the base station, to switch an uplink subframe to a downlink subframe or to switch a downlink subframe to an uplink subframe based on the mixed interference information and to perform a transmit power adjustment interference mitigation operation based on the mixed interference information.

23. The apparatus of claim 20, further configured:

to determine, by a scheduler of the base station, to switch an uplink subframe to a downlink subframe or to switch a downlink subframe to an uplink subframe based on the mixed interference information and to perform a beam forming adjustment interference mitigation operation based on the mixed interference information.

24. The apparatus of claim 20, further configured:

to generate jamming data using the mixed interference information that provides a mixed interference profile for the base station that is used in managing communications with the at least one of the one or more UEs.

25. The apparatus of claim 24, wherein the jamming data comprises a transmit power level adjustment value associated with each communication connection represented in the jamming data.

26. The apparatus of claim 24, wherein managing communications with the at least one of one or more UEs includes switching, based on the jamming data, a time division duplex (TDD) subframe of the base station independent of TDD subframe scheduling implemented by the one or more other base stations.

27. The apparatus of claim 24, further configured:

to analyze, by a scheduler of the base station, the mixed interference profile in association with a putative switch of an uplink subframe to a downlink subframe or a switch of a downlink subframe to an uplink subframe;

to regenerate, by the scheduler, the jamming data using the mixed interference information and a mixed interference mitigation operation, wherein regenerated jamming data provides an interference mitigated mixed interference profile for the base station; and to determine, by the scheduler, to switch an uplink subframe to a downlink subframe or to switch a downlink subframe to an uplink subframe based on the interference mitigated mixed interference profile.

28. The apparatus of claim 27, wherein the mixed interference mitigation operation is selected from the group consisting of a transmit power adjustment and a beam forming adjustment.

29. The apparatus of claim 24, wherein the jamming data comprises a base station-to-base station jamming graph having vertices corresponding to the base station and the one or more other base stations and indicating connections between pairs of vertices of the vertices where base stations corresponding to the pairs of vertices are indicated in the mixed interference information as experiencing undesirable downlink-to-uplink or uplink-to-downlink interference with respect to one another.

30. The apparatus of claim 24, wherein the jamming data comprises a UE-to-UE jamming graph having vertices corresponding to the UEs served by the base station and one or more UEs served by the one or more other base stations and indicating connections between pairs of vertices of the vertices where UEs corresponding to the pairs of vertices are indicated in the mixed interference information as experiencing undesirable downlink-to-uplink or uplink-to-downlink interference with respect to one another.

* * * * *